United States Patent
Henson

[15] 3,671,003
[45] June 20, 1972

[54] CAMPER HOLD-DOWN BRACKET

[72] Inventor: Samuel H. Henson, 1201 W. Prospect Street, Kewanee, Ill. 61443

[22] Filed: Sept. 2, 1970

[21] Appl. No.: 68,914

[52] U.S. Cl. ................................. 248/361 R, 296/23 MC
[51] Int. Cl. .................................... B60p 3/32, B65j 1/22
[58] Field of Search ............... 248/361 R, 361 B, 307, 71; 296/23 MC, 35 A

[56] References Cited

UNITED STATES PATENTS

| | | | |
|---|---|---|---|
| 3,486,785 | 12/1969 | Corson | 248/361 R X |
| 758,114 | 4/1904 | Shertzer | 248/361 |
| 1,577,163 | 3/1926 | Berger | 248/70 X |
| 3,141,210 | 7/1964 | Bryant | 24/73 |
| 3,454,253 | 7/1969 | Lippiatt | 248/361 |

*Primary Examiner*—Chancellor E. Harris
*Attorney*—Hill, Sherman, Meroni, Gross & Simpson

[57] ABSTRACT

A bracket for attaching camper bodies to truck beds equipped with stake pockets wherein the bracket includes a portion extending into the stake pocket for attachment thereto and an outwardly and downwardly extending plate attached to the top of the stake pocket received portion, the plate terminating in a portion having apertures therethrough and a connecting member for adjustable positioning between the apertures and a camper body carried bracket, the connecting member including a J-bolt having its long leg threaded and a hook having a long leg attached to a cylindrical member received around the long leg of the J-bolt and retained thereon by an adjustable nut threaded onto the end of the J-bolt.

3 Claims, 3 Drawing Figures

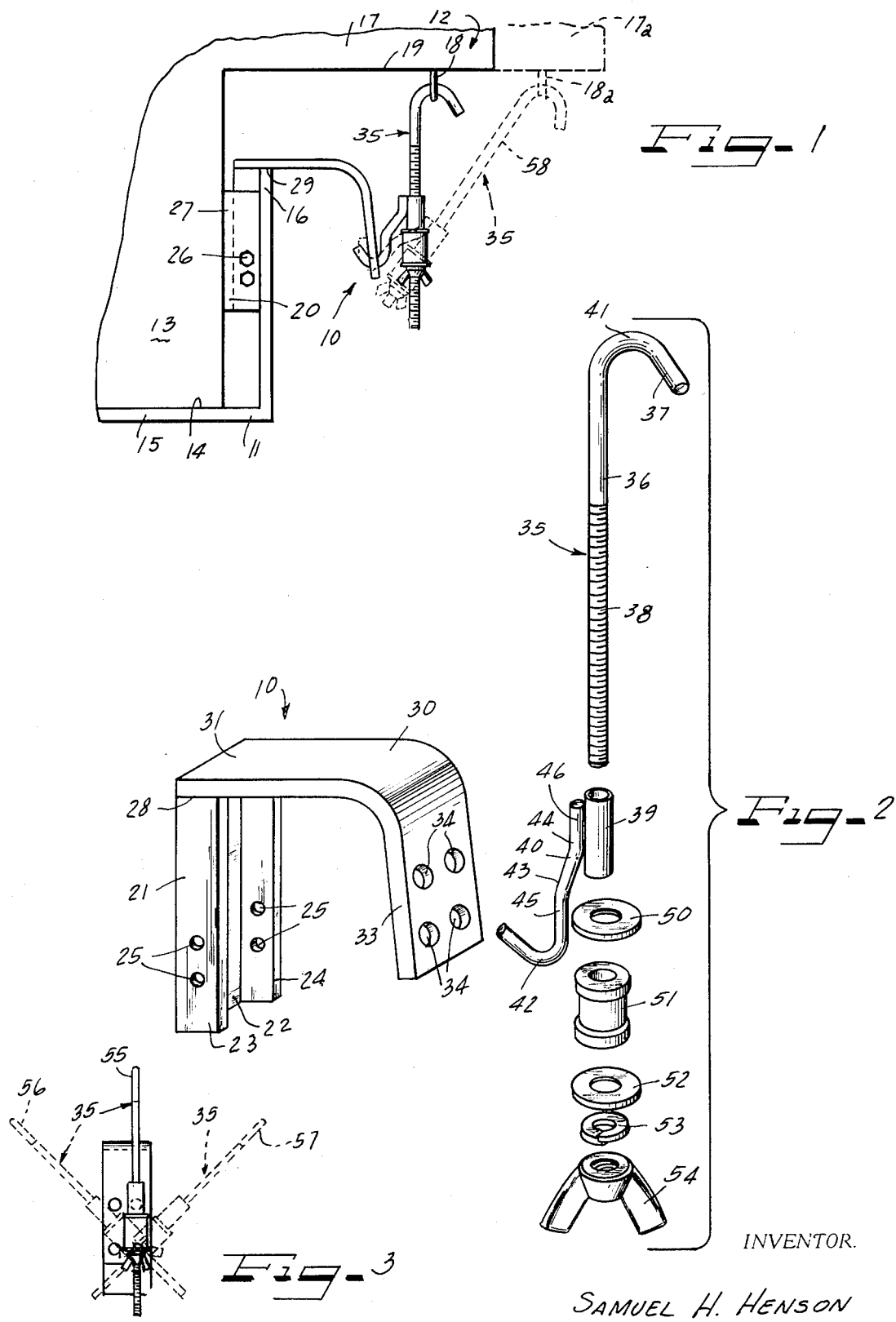

CAMPER HOLD-DOWN BRACKET

BACKGROUND OF THE INVENTION

1. Field of the Invention

This invention relates to fastening devices and more particularly to a hold-down bracket for fastening camper bodies to vehicles.

2. Prior Art

Increased mobility and leisure time have created a market for camper bodies. Campers, such as those to which this invention relates, are designed to be mounted on the bed of a vehicle and attached thereto for transportation thereby. Such campers are oftentimes equipped with facilities for overnight living and accommodate a wide range of designs and sizes. However, the majority of those which are adapted to be mounted on pickup trucks or the like, have in common a central longitudinal section adapted to rest on the bed of the truck and raised side portions which project over the sides of the truck upwardly therefrom. Because such camper bodies are produced separate from the vehicle, they are not normally permanently attached thereto.

It therefore becomes necessary to provide a hold-down device of some type to firmly attach the camper body to the vehicles. A number of different devices have been suggested for accomplishing this result. Included among these are devices which directly attach the camper body to the truck bed or side walls and which require bolts passing through the side walls. A modification of this includes those devices which bolt a bracket to the side wall of the truck by means of bolts passing through the wall of the truck and then attach the bracket to the camper as by means of a turnbuckle. Both types of attachment result in partial destruction of the truck body.

A third type of prior art device utilizes the stake pockets normally provided in the truck for attachment of a bracket. Thereafter, an adjustable device is provided between the bracket received in the stake pocket and a camper body carried attachment member. Devices of this sort, which utilize the stake pocket of the truck, do not result in disadvantageous damage to the truck body. (See for example my pending application U. S. Ser. No. 22,242, filed Mar. 24, 1970.

However, because camper bodies come in a wide range of sizes, such a hold-down assembly must be adjustable both for height and for longitudinal and lateral movement with respect to the normal operating direction of the truck. This adjustability must be accomplished without destroying the security of the hold-down. Additionally, it is preferable that the device be easily attached and removed.

SUMMARY OF THE INVENTION

My invention provides a hold-down unit for camper bodies which is easily adjustable both forward and backward, inward and outward and vertically.

The bracket includes a U-shaped cross section beam dimensioned to be received in a stake pocket of the truck and fastened therein with one end projecting from the stake pocket to a point approximately level with the top of the side wall of the truck. Attached to the end of the beam is one end of an outwardly and downwardly extending plate which terminates in spaced relation to the side wall of the truck in an apertured end piece.

Most camper bodies have associated therewith anchoring holes for receiving a hold-down bracket. An adjustable member extends between the apertured end of the outwardly and downwardly extending plate and the anchoring hole which includes a threaded end J-bolt which is received in the anchoring hole. A hook member attached to a tubular member is received in one of the apertures of the outwardly and downwardly extending plate with the tubular member received around the threaded leg of the J-bolt. A series of washers and a rubber spring terminating in an adjustable nut fastens the tubular member to the J-bolt.

Because the attachment between the plate and the adjustable member is by means of a hook member passing through one of the apertures, the adjustable member is fully pivotable with respect to the plate whereby it may be extended inwardly and outwardly and forwardly and backwardly. Further, because of the use of an elongated J-bolt and an adjustable nut, the tension distance between the hook and the end of the J-bolt is adjustable to accommodate varying heights of different camper bodies.

It is therefore an object of this invention to provide an improved camper body hold-down bracket.

It is yet another object of this invention to provide a camper holddown bracket which is attached to a truck body via the stake pocket and which is adjustable to accommodate varying sizes of camper bodies.

It is yet another and more specific object of this invention to provide a camper body hold-down bracket having one member thereof adapted to receive the stake pocket of a truck with a portion extending outwardly and downwardly therefrom into spaced relation with the side of the truck and an adjustable portion attachable to the outwardly and downwardly extending portion and to the camper body which includes opposed hooks, one of which is attachable to the camper body, the other of which is attachable to the outwardly and downwardly extending plate in adjustable spaced-apart pivotable relationship.

BRIEF DESCRIPTION OF THE DRAWINGS

Other objects, features and advantages of the invention will be readily apparent from the following description of a preferred embodiment thereof, taken in conjunction with the accompanying drawing, although variations and modifications may be effected without departing from the spirit and scope of the novel concepts of the disclosure, and in which:

FIG. 1 is a fragmentary plan view of the hold-down unit of this invention in place in a vehicle and attached to a camper body.

FIG. 2 is a disassembled view of the hold-down unit of this invention.

FIG. 3 is a fragmentary plan view of the hold-down unit of this invention illustrating the pivotability thereof by broken lines.

DESCRIPTION OF THE PREFERRED EMBODIMENT

FIG. 1 illustrates the hold-down unit 10 of this invention attached to a vehicle body 11 such as a truck body and to a camper body 12.

The camper body 12 has a central portion 13 which rests on the top 14 of the bed 15 of the vehicle body 11. The central portion 13 extends above the side wall 16 of the vehicle bed where it joins with side portions 17 of the camper body which extend outwardly to the side of the vehicle. An eye hook or attachment bracket 18 depends from the underside 19 of the side portion 17 of the camper and is used for fastening the camper to the truck.

Inasmuch as camper bodies come in various sizes and configurations, the placement of the attachment bracket 18 varies considerably. This is illustrated by the dotted lines indicating a wider camper 17a having its attachment bracket 18a at a greater distance from the side of the truck.

Most pickup trucks and the like have associated with their side walls 16 stake pockets 20. In order to avoid damage to the side wall 16 of the truck, this invention makes use of the stake pockets 20 to provide an anchor to the truck for the hold-down bracket 10. Inasmuch as placement of the stake pockets 20 is dictated by the manufacturer of the truck, they are not always directly inwardly from the attachment bracket 18 on the camper body. The variances in placement of the stake pocket 20 coupled with the variances in placement of the attachment bracket that a hold-down bracket 10 be adaptable to a wide variety of situations. Primarily, the bracket must be adjustable inwardly and outwardly to accommodate varying width camper bodies and varying placement of the attachment bracket 18 thereon. The bracket must also be adjustable forward and backwardly in the direction of the truck so as to accommodate varying placement of the stake pocket or of the attachment bracket 18. Further, the hold-down bracket should be adjustable vertically to accommodate varying differences in height caused either by taller or shallower truck side walls or higher or shorter-than-normal camper bodies.

The hold-down bracket of my invention is fully adjustable to be usable in a wide variety of truck camper body combinations.

As best illustrated in FIG. 2, the hold-down bracket 10 includes a stake pocket received portion 21 which is substantially U-shaped in cross-section having a flat bight portion 22 and two short side walls 23 and 24. The side walls 23 and 24 have apertures 25 therethrough so that they may be fastened in the stake pocket as by bolts 26 passing through the side walls 27 of the stake pocket 20.

The U-shaped cross section bracket 21 has a length sufficient so that the top 28 thereof is flush with or slightly above the top 29 of the side wall 16 of the truck when the member 21 is bolted into the stake pocket. A substantially right-angled plate 30 has one end 31 attached to the top 28 of the member 21 and forms an outwardly and downwardly extending plate which terminates in spaced relation to the side wall 16 of the truck. The outermost leg 33 of the plate 30 may have a plurality of apertures 34 therethrough.

An adjustable member 35 connects between one of the apertures 34 and the attachment bracket 18 of the camper body. The adjustable member 35 includes a J-bolt 36 having a short leg 37 and a threaded long leg 38. Received around the long leg 38 is a tubular member 39 having attached thereto a hook 40 which is opposed to the hook 41 formed by the J-bolt. The hook 40 may be constructed of a piece of bar stock which is bent in a substantially wide "U" 42 to form the hook portion and has a double angled bend 43 and 44 intermediate the ends of the long leg 45 thereof. The terminal portion 46 of the long leg 45 is attached to the outside of the cylindrical member 39 as by welding. The double bends 43 and 44 provide that the remainder of the long leg is spaced from the axis of the cylindrical member 39.

The cylindrical member 39 is attached to the J-bolt by passing the J-bolt through the cylindrical member 39, thence through a washer 50, a rubber spring 51, a further washer 52, a lock washer 53, and an adjustable wing nut 54. The provision of the bends 43 and 44 in the long leg of the hook 40 spaces that portion of the hook which depends beyond the cylindrical member 39 a sufficient distance from the axis of the J-bolt so as to allow receipt of the washers 50 and 52 and the spring 51.

The hook 42 is received in one of the apertures 34 and is pivotable therein as illustrated in FIG. 3, whereby the adjustable member 35 may be positioned with respect to the outwardly and downwardly extending plate vertically as at 55 or angled backwardly as at 56 or frontwardly as at 57 with respect to the truck. Further, as can be seen in FIG. 1, the adjustable portion may extend outwardly as at 58 from a true vertical, or may be positioned inwardly or directly vertical depending upon the placement of the attachment bracket 18.

Further, the height of the unit can be adjusted by tightening the wing nut 54 to reduce the height thereof and vertical and horizontal distances may be varied by choosing different apertures 34. Further, because the cylindrical member 39 is pivotable around the J-bolt 36, the hold-down bracket of this invention may be used with a wide variety of attachment brackets 18 while always maintaining the hooks 41 and 42 in opposed relation.

Although the J-bolt 35 is illustrated as received through the member 18 and the member 40 is illustrated as received in one of the apertures 34 of the outwardly and downwardly extending plate, it is to be understood that the unit can be reversed with the J-bolt inserted into one of the apertures 34 and the hook 40 received through the attachment bracket 18.

It can therefore be seen from the above that my invention provides an improved camper hold-down bracket which is fully adjustable and adaptable to a wide variety of differing types of camper body receiving vehicles and camper bodies.

I claim as my invention:

1. In a camper hold-down bracket having a portion receivable in the stake pocket of a vehicle and an outwardly and downwardly extending plate attached to one end of said portion, the improvement of: an adjustable member for connecting a camper to the said outwardly and downwardly extending plate which comprises: a J-bolt having a hooked end and a threaded long leg, a cylindrical member received around said long leg, and a hook member depending from said cylindrical member and attached thereto, adjustable means retaining said tubular member around said long leg of said J-bolt, said adjustable means effective to determine the maximum distance between the hooked end of the J-bolt and the cylindrical member, the said cylindrical member being freely rotatable with respect to the J-bolt, the said plate having a plurality of openings therethrough, the said openings dimensioned to receive a portion of the hook member therethrough in freely pivotable relationship thereto, the pivotability of the hook member with respect to the plate being in both the plane of projection of the plate from the portion receivable in the stake pocket and in a plane normal to that plane.

2. A camper hold-down bracket comprising: a first member adapted to be received securely in the stake pocket of a vehicle body with one end thereof terminating substantially even with the top of the vehicle body side wall, an outwardly and downwardly extending substantially L-shaped plate having one end of one leg thereof attached to said one end, whereby the other leg thereof lies in spaced relation from said member, an aperture through said other leg, a J-bolt having a threaded long leg, an axially elongated tubular member freely received around said threaded long leg, a hook attached to said tubular member depending therefrom in opposed relation to the hook of the said J-bolt, and adjustable means maintaining said tubular member on said long leg, said hook having a long leg and a short leg and being of wide "U" shape, the said long leg having a surface thereof attached to the outside surface of the said tubular member projecting axially thereof.

3. The bracket of claim 2 wherein a plurality of spaced apertures are provided on the said other leg of the said plate.

* * * * *